United States Patent [19]

Tsuchihashi et al.

[11] Patent Number: 4,605,236
[45] Date of Patent: Aug. 12, 1986

[54] CYLINDER HEAD GASKET CONSTRUCTION

[75] Inventors: Keiichi Tsuchihashi; Shinji Yamada; Makoto Arakawa; Osamu Aizawa; Nobuyuki Otomo, all of Tokyo, Japan

[73] Assignees: Hino Jidosha Kogyo Kabushiki Kaisha; Marusan Packing Manufacturing Co., both of Tokyo, Japan

[21] Appl. No.: 644,924

[22] Filed: Aug. 27, 1984

[30] Foreign Application Priority Data

Aug. 29, 1983 [JP] Japan ................................ 58-157447

[51] Int. Cl.4 .......................................... F16J 15/12
[52] U.S. Cl. ................................ 277/235 B; 277/234
[58] Field of Search ................ 277/235 B, 229, 233, 277/166, 234, 235 R, 235 A, 236

[56] References Cited

U.S. PATENT DOCUMENTS

| | | | |
|---|---|---|---|
| 3,532,349 | 10/1970 | Czernik | 277/235 B |
| 4,464,287 | 8/1984 | Bindel | 277/235 B |
| 4,518,168 | 5/1985 | Belter | 277/235 B |
| 4,531,750 | 7/1985 | Herrington | 277/235 B |
| 4,535,999 | 8/1985 | Locacius | 277/235 B |

*Primary Examiner*—Robert S. Ward
*Attorney, Agent, or Firm*—Cushman, Darby & Cushman

[57] ABSTRACT

An improved gasket where the openings in the gasket which fit around the cylinder bores is provided with a grommet which is generally U-shaped in cross-section, having spaced ends at least one of which is bent inwardly to engage the bore wall of the grommet to securely hold the grommet in place in the gasket opening.

6 Claims, 7 Drawing Figures

CYLINDER HEAD GASKET CONSTRUCTION

FIELD OF THE INVENTION

The present invention relates to a structure of the cylinder head gasket for engines. More particularly, it relates to the structure for securely retaining a grommet for cylinder head gasket for engines.

PRIOR ART

FIG. 1 is a perspective view of a conventional cylinder head gasket. FIG. 2 is a cross-sectional view of the cylinder head gasket along A—A.

A conventional cylinder head gasket 1 comprises a grommet 3 inserted in advance with a compression ring 4 pressed in the bores of the main body 2 of the gasket. Since the outer diameter of the grommet 3 cannot be made greater than the inner diameter of the bores in the main body 2 of the gasket, a flange is provided on the outer periphery of the grommet 3 so that the peripheral edge of each bore in the gasket main body is slightly pushed underneath the flange. This construction creates a small gap between the outer periphery of the compression ring 4 retained by the grommet 3 and the inner periphery of the bores in the gasket main body 2, causing the grommet to assume an eccentric position in respect of the center of the bore.

When the cylinder head gasket 1 of this construction is pressed onto the cylinder liner from above, the inner periphery of the bores in the gasket main body 2 will enter deeper into the U shaped groove formed by the outer periphery of the grommet 3 on one side because of the eccentricity of the grommet 3. However, the inner periphery of the bore on the other side tends to come out of the groove, often resulting in cuts in the gasket main body 2. Moreover, if the grommet is attached to the gasket in a displaced manner, the sealing stress may vary at different points on the periphery of the aperture. This is contrary to the principal object of uniformly pressing against the periphery of the bore. The conventional cylinder head gasket 1 of this construction was therefore defective in that it required minute care and prolonged time as well as skill in placing the same onto the cylinder head liner.

Although automatic assembly of engines has been proposed in the art unless the defects mentioned above are solved, the automation cannot be realized.

The inventor of this invention succeeded in overcoming these problems with the present invention by modifying a part of the configuration of the outer periphery of the conventional cylinder head gasket so that the pressing operation and the inserting process can be employed during the manufacturing process of the cylinder head gasket.

OBJECT OF THE INVENTION

The present invention aims to provide a cylinder head gasket construction which securely fixes the grommet to a predetermined position in the gasket main body, the sealing stress to be uniformly distributed, the time in attaching the gasket to be reduced, thereby enabling automation of gasket assembly.

FEATURES OF THE INVENTION

The present invention is characterized in that in a cylinder head gasket for engines comprising a metal grommet provided around the cylinder bore and a metal compression ring enveloped by the inner periphery of said grommet, at least one end of said metal grommet is abutted against the bore wall in the gasket main body so that the grommet can be fixed securely.

The construction may be such that one end of the metal grommet is abutted against the bore wall of the gasket main body while the other end contacts flatly against the surface of the gasket main body.

It is also possible to make both ends of the metal grommet to abut against the bore wall of the gasket main body. In this case, the core of the sheet the gasket main body is preferably made of metal and the like rigid material such as steel plate.

The cylinder head gasket according to the present invention is provided with grommet which is securely fixed in the gasket main body with the required precision, there is no chance of the grommet being displaced at the time the cylinder head gasket is attached to the cylinder liner or of uneven distribution of the sealing stress due to the displacement of the grommet. The present invention is further advantageous in that the gas sealability between cylinder and block will become more tight and the time required for assembling the gasket can be reduced and that the automated gasket assembly can be realized.

With the grommet construction according to the present invention, it can be attached to the gasket during the manufacture of the cylinder head gasket, thereby eliminating the need to add a subsequent step and reducing the total number of steps in the entire manufacturing process.

Figure 1:
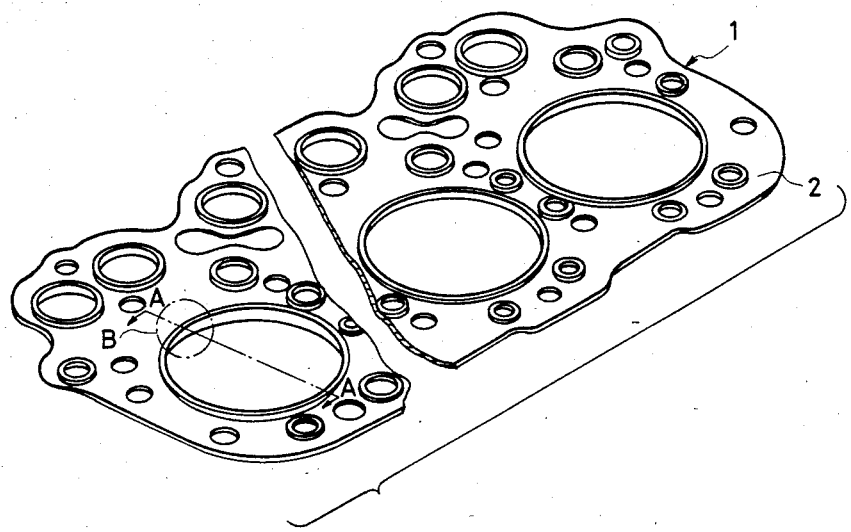
FIG. 1 is a perspective view of a cylinder head gasket.
Figure 2:
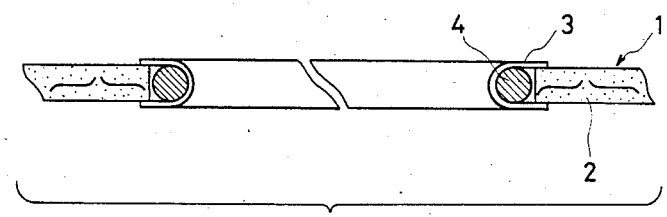
FIG. 2 is a cross-sectional view of the cylinder head gasket in FIG. 1 along A—A.

In the drawings, reference number 1 denotes a cylinder head gasket, 2 a gasket main body, 3 and 5 grommets, and 4 a compression ring.

DETAILED DESCRIPTION OF THE INVENTION

The embodiments of the present invention will now be described in detail with reference to the accompanying drawings.

Figure 3:
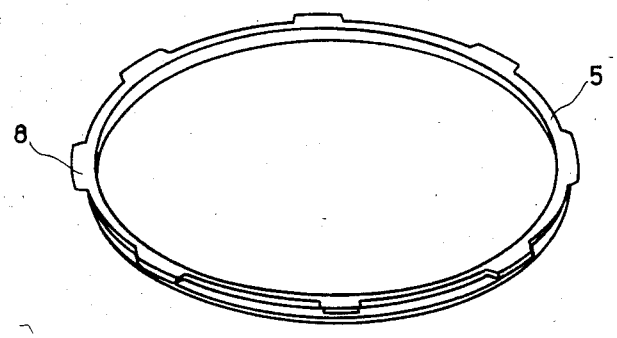
FIG. 3 is a perspective view of a grommet according to the present invention which is provided with projections at the outer periphery.
Figure 4:
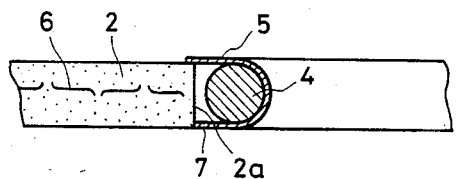
FIG. 4 is a partially enlarged view of the first embodiment of the grommet according to the present invention.

The first embodiment of the cylinder head gasket according to the present invention is provided with an annular grommet 5 as shown in FIG. 3 in the bore of the main body 2 thereof having a core metal 6. The grommet 5 is so shaped that its cross section assumes a U-shape for retaining therein a compression ring 4. The upper end of the grommet 5 is formed with flanges 8 to contact with the upper surface of the gasket main body 2. As shown in FIG. 3, a plurality of flanges are spaced about the periphery of the grommet body 1. One of the features of the present invention lies in the configuration of the grommet at its lower end portion. As shown in the partially enlarged view of FIG. 4, the lower end of the flange of the grommet 5 is formed to face the wall 2a of the bore in the gasket main body 2, with the outer circumference thereof being slightly greater than the inner circumference of the bore wall 2a of the gasket main body 2. With this configuration, the grommet is pressed firmly into the gasket with the outer peripheral edge of the lower flange 7 abutting against the bore wall 2a.

As the outer periphery of the lower edge of the grommet 5 is pressed into the bore wall of the gasket main body 2, the grommet 5 is prevented from slipping out and is firmly and securely fixed at a predetermined position.

The flange shape 8 is not limited to the one shown in FIG. 3 which has spaced portions, but may be continuous around the entire periphery.

Figure 5:
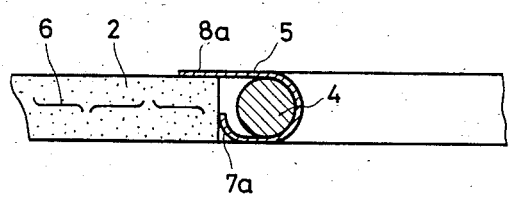
FIG. 5 is a partially enlarged view of the second embodiment of the grommet according to the present invention.

As shown in the partially enlarged cross sectional view of FIG. 5, the second embodiment of the grommet 5 according to the present invention has its upper edge 8a contacted with the gasket main body, and its lower edge 7a bent inward while maintaining a small gap between the grommet and the compression ring 4. With this configuration, the grommet 5 is pressed into the gasket main body 2.

In this embodiment, the lower edge of the grommet 5 firmly presses against the bore wall of the gasket main body 2 by the spring force thereof to open outward and whereby the grommet 5 is securely held in place. As compared with the first embodiment, the contact of the upper end in this embodiment with the gasket main body 2 is broader and since the spring force of the curved lower end acts in the direction of the outer periphery, there is a greater precision tolerance.

Figure 6:
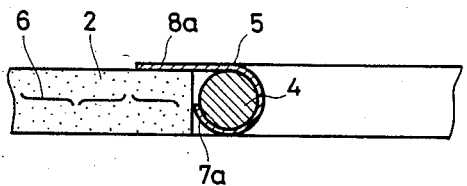
FIG. 6 is a partially enlarged view of the third embodiment of the grommet according to the present invention.

As shown in FIG. 6, the third embodiment of the grommet 5 is identical with that of the first and the second embodiments at the upper edge where it contacts the gasket main body 2 continuously or discontinuously. The grommet 5 is pressed into the gasket main body 2 with its lower edge engaging and retaining the compression ring 4 which has a slightly smaller outer circumference than the bore wall of said gasket main body 2.

In this embodiment, the repelling force of the compression ring 4 in the direction of the outer periphery acts on the bore wall of the gasket main body 2 to thereby hold the grommet 5 firmly in place.

Figure 7:
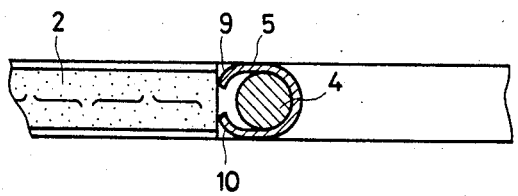
FIG. 7 is a partially enlarged view of the fourth embodiment of the grommet according to the present invention.

The fourth embodiment of the present invention has a U-shaped cross-section as shown in FIG. 7 so that both ends 9, 10 of the grommet 5 will abut against the bore wall of the gasket main body 2. In this embodiment, both ends of the grommet 5 act to press open in the outward direction against the bore wall of the gasket, whereby the grommet 5 is securely retained at its predetermined position in the gasket. Since a strong force acts on the bore wall of the gasket main body 2 in this construction the gasket main body 2 is preferably made of a rigid material. The gasket main body 2 in this embodiment is essentially made of a cold rolled steel plate which is covered on both surfaces with a sheet of asbestos or carbon fibers used as the base material.

The present invention is advantageous in that the grommet 5 can be attached to the gasket main body 2 during the process of manufacturing the cylinder head gasket 1 itself. The cylinder head gasket 1 thus manufactured can be mounted on the cylinder liner without causing displacement of the grommet. There is thus no possibility of cutting the gasket main body 2 and the planer pressure can be distributed uniformly over the entire outer circumference of the gasket, enabling the gasket to adequately perform its function.

What is claimed is:

1. In a cylinder head gasket for engines comprising a gasket main body formed with bores and bore walls to match with the cylinder bore and a metal grommet provided in said bore of the gasket about the periphery of the gasket bore, said metal grommet having an arcuate cross-section with spaced apart ends and retaining a metal compression ring in an enveloping fashion, with at least one said end of said metal grommet being bent so as to exert a spring abutting force on the bore wall of the gasket to assist in holding and centering the grommet relative to said bore wall.

2. The cylinder head gasket as claimed in claim 1 wherein one end of said metal grommet abuts with the bore wall of the gasket and the other end thereof is formed with a flange, said flange abutting against the surface of the gasket.

3. The cylinder head gasket as claimed in claim 1 wherein both ends of said metal grommet abut against the bore wall of the gasket.

4. The cylinder head gasket as claimed in claim 3 wherein the base material for the main body of the gasket is metal.

5. The cylinder head gasket as claimed in claim 4 wherein the base material for the main body of the gasket is steel plate.

6. The invention as claimed in claim 1 wherein said at least one end is bent toward the other end of said grommet with the spring force tending to urge the said at least one end to open outwardly away from said other end of said grommet.

* * * * *